United States Patent

Moser et al.

[11] 3,861,899
[45] Jan. 21, 1975

[54] HERBICIDAL N-(ALKOXYPHOSPHINYLOXY)-AND N-(ALKOXYPHOSPHINO-THIOYLOXY)-N-ALKYL-N'-PHENYLUREAS

[75] Inventors: Hans Moser, Basel; Christian Vogel, Binningen, both of Switzerland

[73] Assignee: Ciba-Geigy Corporation, Ardsley, N.Y.

[22] Filed: Jan. 22, 1973

[21] Appl. No.: 325,684

Related U.S. Application Data

[62] Division of Ser. No. 41,368, May 28, 1970, Pat. No. 3,726,947.

[30] Foreign Application Priority Data

June 6, 1969 Switzerland.................. 8644/69

[52] U.S. Cl.......................................... 71/86, 71/87
[51] Int. Cl.................................................. A01n 9/36
[58] Field of Search................................. 71/86, 87

[56] References Cited
UNITED STATES PATENTS

| | | | |
|---|---|---|---|
| 3,384,683 | 5/1968 | Schwanze et al. | 71/86 |
| 3,393,253 | 7/1968 | Wiesboeck | 71/86 |
| 3,419,620 | 12/1968 | Becher et al. | 71/86 |

Primary Examiner—James O. Thomas, Jr.
Attorney, Agent, or Firm—Frederick H. Rabin

[57] ABSTRACT

N-(Alkoxy-phosphinyloxy)- and N-(alkoxy-phosphinothioyloxy)-N-alkyl-N'-substituted ureas of the formula

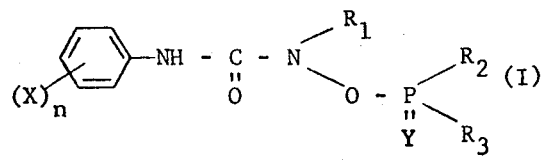

In this formula:
 $R_1$ represents methyl or ethyl,
 $R_2$ and $R_3$ each independently represent a lower alkoxy or dialkylamino radical,
 X represents a lower alkyl, alkoxy, alkylthio or halogenoalkyl radical, halogen or the cyano group,
 Y represents oxygen or sulfur, and
 $n$ represents a number from 0 to 3, which are useful as herbicides in a method for controlling weeds and wild grasses are described. Compositions containing such compounds are also described.

6 Claims, No Drawings

HERBICIDAL N-(ALKOXYPHOSPHINYLOXY)-AND N-(ALKOXYPHOSPHINO-THIOYLOXY)-N-ALKYL-N'-PHENYLUREAS

This is a division of application Ser. No. 41,368, filed on May 28, 1970, now U.S. Pat. No. 3,726,947.

The present invention concerns new urea compounds, process for the production thereof, herbicidal compositions, containing the new ureas as active ingredient and a method for the control of weeds and wild grasses employing the new active substances or compositions containing them.

The novel urea compounds correspond to the Formula I:

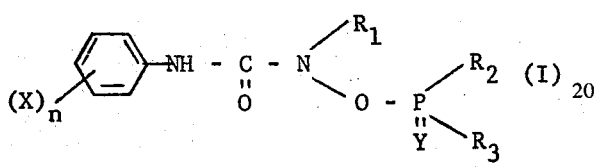

In this formula:
- $R_1$ represents methyl or ethyl,
- $R_2$ and $R_3$ each independently represent a lower alkoxy or dialkylamino radical,
- X represents a lower alkyl, alkoxy, alkylthio or halogenoalkyl radical, halogen or the cyano group,
- Y represents oxygen or sulfur, and
- n represents a number from 0 to 3.

In Formula I, lower alkyl radicals X mean straight or branched-chain radicals having 1 to 4 carbon atoms, such as methyl, ethyl, n-propyl, isopropyl, n-butyl, sec-butyl, tert-butyl. Such alkyl radicals likewise form the alkyl part of lower alkoxy, alkylthio, halogenoalkyl or dialkylamino radicals X, $R_2$ and $R_3$. Halogenoalkyl radicals mean lower alkyl radicals substituted by fluorine, chlorine and/or bromine, in particular the trifluoromethyl radical. Halogen means fluorine, chlorine, bromine, and iodine.

The novel urea compounds of the Formula I are produced according to the invention by reacting a hydroxy urea of the Formula II:

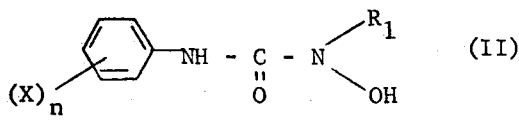

with a halide of the Formula III:

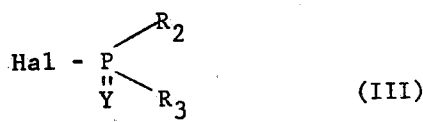

in the presence of a base and a solvent or diluent which is inert towards the reaction components. In Formulas II and III, X, Y, $R_1$, $R_2$, $R_3$ and n have the meanings given for Formula I, Hal means chlorine or bromine. The reaction temperatures lie between −20° and 80°C. Tertiary amines such as trialkylamines and pyridine bases, inorganic bases such as hydroxides and carbonates of alkali metals and alkaline earth metals are employed as bases. Examples of solvents or diluents suitable for the process according to the invention are aliphatic and aromatic compounds such as dioxane, tetrahydrofuran, N,N-dialkylated amides, ketones, nitriles, alcohols such as alkanols, water and mixtures of organic solvents with water such as alcohol/water mixtures or chloroform/water mixtures.

The novel urea compounds of Formula I, in which $R_2$ represents a dialkylamino radical and $R_3$ represents an alkoxy radical, are obtained by a modification of the process according to the invention by reacting a hydroxyurea compound of Formula II with a dihalide of Formula IV:

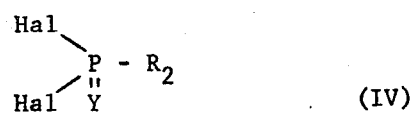

wherein
- Hal represents chlorine or bromine,
- $R_2$ represents a dialkylamino group, and
- Y represents oxygen or sulfur, in an alkanol of the formula V

wherein
$R_3$ is a lower alkyl radical in the presence of an acid-binding agent.

The known hydroxy-ureas of Formula II, employed as starting materials, can be obtained by known methods by reacting the appropriately substituted phenylisocyanates with appropriately substituted hydroxylamines.

The novel urea compounds of Formula I are obtained in the process according to the invention in good yields and in good purity. Some of the compounds are crystalline, others are oils; they are readily soluble in the usual solvents, sparingly soluble in water and various carbohydrates.

The novel ureas of Formula I possess excellent herbicidal properties and can be employed for the control of mono- and di- cotyledoneous weeds and wild grasses. In concentration of from 8 to 20 kg/ha the new ureas have a total herbicidal effect, in concentrations of from 0.5 to 8 kg/ha they have a selective herbicidal effect. The action of these substances includes the types of weeds which are difficult to control as well as the deep rooted types, e.g. leguminous and umbelliferous plants. They can be applied with equal success before (pre-emergence) and after emergence (postemergence) of the plants. Thus field weeds, such as types of millet (Panicum sp.), types of mustard (Sinapis sp.), types of goose foot (Chenopodiaceae), field foxtail (Alopecurus sp.) and other types of foxtail, e.g. Amaranthus sp., grasses, e.g. Lolium sp., compositae, e.g. Taraxacum sp., types of chamomile (matricaria sp.) can be destroyed or their growth can be hindered without damaging cultivated plants.

The following examples illustrate the production of the new compounds of Formula I according to the invention. Where not stated otherwise, temperatures are expressed in degrees centigrade.

EXAMPLE 1

To a solution of 195 g of N'-(3,4-dichlorophenyl)-N-methyl-N-hydroxy-urea and 127 ml of triethylamine in 2 liters of benzene, there are slowly added dropwise with stirring at 10°–15°, 172 g of chloro O,O-diethyl thiophosphate, dissolved in 250 ml of benzene. The reaction mixture is stirred for 12 hours at room temperature and then heated for 2 hours at 50° to 60°. After cooling, the precipitate is removed by filtration and the filtrate is concentrated in vacuum. The residual yellow oil is boiled up with petroleum ether, purified with animal charcoal and decanted. The N-(diethoxyphosphinothioyloxy)-N-methyl-N'-(3,4-dichlorophenyl)-urea has a melting point of 40° to 42°.

EXAMPLE 2

23.5 g of N'-(3,4-dichlorophenyl)-N-methyl-N-hydroxy-urea are dissolved in 240 ml of ethanol. The solution is cooled to −10° and treated with 18.3 ml of 6 N aqueous sodium hydroxide solution. At the same temperature 19 g of chloro O,O-diethyl phosphate are then added dropwise. The reaction mixture is then kept at room temperature and after neutralization and a negative FeCl₃ test, poured into ice water. The precipitate is separated, washed with ice water and dried. Recrystallized from methanol, the N-(diethoxy-phosphinyloxy)-N-methyl-N'-(3,4-dichloro-phenyl)-urea has a melting point of 111°–113°.

EXAMPLE 3

To a solution of 23.5 g of N'-(3,4-dichlorophenyl)-N-methyl-N-hydroxy-urea in 250 ml of ethanol, there are slowly added dropwise with stirring at 0°–10°C, 18.33 ml of 6 N sodium hydroxide solution and then 17.82 g of (dimethylamido)-phosphoryl dichloride. Stirring is continued for half an hour and 16.6 ml more of 6 N sodium hydroxide solution are added dropwise at 5°–10°. Then the reaction mixture is stirred at room temperature and after attaining a neutral reaction and a negative result in the FeCl₃ test, poured into ice water. The resulting precipitate is separated, washed with ice water and dried. After recrystallization from ethanol, the obtained N-(ethoxy-dimethylaminophosphinyloxy)-N-methyl-N'-(3,4-dichlorophenyl)-urea has a melting point of 96°–98°.

EXAMPLE 4

First 16.7 ml of 6N sodium hydroxide solution and then 14.5 g of chloro O,O-dimethyl phosphate are added dropwise at 20°–25° with stirring to a suspension of 24.5 g of N'-(4-bromophenyl)-N-methyl-N-hydroxy-urea in 300 ml of methylene chloride and 150 ml of water. Stirring is continued for 1 hour at room temperature. After the reaction has become neutral and a negative result is obtained in the FeCl₃ test, the organic phase is separated, washed with water and dried over sodium sulfate. The crystalline residue which remains after evaporation of the methylene chloride is recrystallized from benzene. The N-(dimethoxy-phosphinyloxy)-N-methyl-N'-(4-bromophenyl)-urea obtained has a melting point of 135°–137°.

The compounds of Formula I listed in the following table were produced by the methods described in the above examples starting from the appropriate amounts of hydroxyphenyl-urea:

Table I

| Example No. | Compound | Physical data |
| --- | --- | --- |
| 5 | N-(diethoxy-phosphinyloxy)-N-methyl-N'-(4-bromophenyl)-urea | m.p. 85–87° |
| 6 | N-(diethoxy-phosphinyloxy)-N-methyl-N'-(2-chlorophenyl)-urea | m.p. 48–50° |
| 7 | N-(diethoxy-phosphinyloxy)-N-methyl-N'-(3-methyl-phenyl)-urea | m.p. 44–46° |
| 8 | N-(diethoxy-phosphinyloxy)-N-methyl-N'-(2-methyl-phenyl)-urea | m.p. 42–46° |
| 9 | N-[bis-(dimethylamino)-phosphinyloxy]-N-methyl-N'-phenyl-urea | $n_D^{20} = 1.5226$ |
| 10 | N-[bis-(dimethylamino)-phosphinyloxy]-N-methyl-N'-(3,4-dichlorophenyl)-urea | m.p. 84–86° |
| 11 | N-(dimethoxy-phosphinothioyloxy)-N-methyl-N'-phenyl-urea | m.p. 60–61° |
| 12 | N-(dimethoxy-phosphinothioyloxy)-N-methyl-N'-(4-bromophenyl)-urea | m.p. 58–60° |
| 13 | N-(dimethoxy-phosphinothioyloxy)-N-methyl-N'-(4-iodophenyl)-urea | m.p. 57–59° |
| 14 | N-(dimethoxy-phosphinothioyloxy)-N-methyl-N'-(3,4-dichlorophenyl)-urea | m.p. 75–77° |
| 15 | N-(dimethoxy-phosphinothioyloxy)-N-methyl-N-'-(4-methylthio-phenyl)-urea | m.p. 35–37° |
| 16 | N-(diethoxy-phosphinothioyloxy)-N-methyl-N'-phenyl-urea | m.p. 36–38° |
| 17 | N-(diethoxy-phosphinothioyloxy)-N-methyl-N-'(3-chlorophenyl)-urea | m.p. 50–52° |
| 18 | N-(diethoxy-phosphinothioyloxy)-N-methyl-N-'-(4-chlorophenyl)-urea | $n_D^{20} = 1.5439$ |
| 19 | N-(diethoxy-phosphinothioyloxy)-N-methyl-N'-(4-fluorophenyl)-urea | m.p. 34–35° |
| 20 | N-(diethoxy-phosphinothioyloxy)-N-methyl-N'-(4-bromophenyl)-urea | m.p. 42–45° |
| 21 | N-(diethoxy-phosphinothioyloxy)-N-methyl-N'-(4-iodophenyl)-urea | m.p. 49–51° |
| 22 | N-(diethoxy-phosphinothioyloxy)-N-methyl-N'-(2-chlorophenyl)-urea | $n_D^{20} = 1.5417$ |
| 23 | N-(diethoxy-phosphinothioyloxy)-N-methyl-N'-(3-trifluoromethyl-phenyl)-urea | m.p. 64–66° |
| 24 | N-(diethoxy-phosphinothioyloxy)-N-methyl-N'-(2-methyl-phenyl)-urea | $n_D^{20} = 1.5345$ |
| 25 | N-(diethoxy-phosphinothioyloxy)-N-methyl-N'-(3-methyl-phenyl)-urea | m.p. 38–40° |
| 26 | N-(diethoxy-phosphinothioyloxy-N-methyl-N'-(4-methyl-phenyl)-urea | $n_D^{20} = 1.5334$ |

Table I-Continued

| Example No. | Compound | Physical data |
| --- | --- | --- |
| 27 | N-(diethoxy-phosphinothioyloxy)-N-methyl-N'-(2-methoxy-phenyl)-urea | $n_D^{20} = 1.5345$ |
| 28 | N-(diethoxy-phosphinothioyloxy)-N-methyl-N'-(4-ethoxy-phenyl)-urea | $n_D^{20} = 1.5322$ |
| 29 | N-(diethoxy-phospinothioyloxy)-N-methyl-N'-(4-methylthio-phenyl)-urea | m.p. 44–46° |
| 30 | N-(diethoxy-phosphinothioyloxy)-N-methyl-N'-(4-cyano-phenyl)-urea | $n_D^{20}$ 1.5510 |
| 31 | N-(diethoxy-phosphinothioyloxy)-N-ethyl-N'-(3,4-dichlorophenyl)-urea | m.p. 40–42° |
| 32 | N-(dimethoxy-phosphinyloxy)-N-methyl-N'-(3-iodophenyl)-urea | |
| 33 | N-dimethoxy-phosphinothioyloxy)-N-methyl-N'-(3-iodophenyl)-urea | |
| 34 | N-(diethoxy-phosphinyloxy)-N-methyl-N'-(3-iodophenyl)-urea | |
| 35 | N-(diethoxy-phosphinothioyloxy)-N-methyl-N'-(3-iodophenyl)-urea | |
| 36 | N-(dimethoxy-phosphinyloxy)-N-methyl-N'-(3-chloro-4-methoxy-phenyl)-urea | m.p. 128–130° |
| 37 | N-(dimethoxy-phosphinothioyloxy)-N-methyl-N'-(3-chloro-4-methoxyphenyl)-urea | m.p. 100–102° |
| 38 | N-(diethoxy-phosphinyloxy)-N-methyl-N'-(3-chloro-4-methoxy-phenyl)-urea | m.p. 82–84° |
| 39 | N-(diethoxy-phosphinothioyloxy)-N-methyl-N'-(3-chloro-4-methoxy-phenyl)-urea | m.p. 70–72° |
| 40 | N-(dimethoxy-phosphinyloxy)-N-methyl-N'-(3-chloro-4-methyl-phenyl)-urea | m.p. 89–91° |
| 41 | N-(dimethoxy-phosphinothioyloxy)-N-methyl-N'-(3-chloro-4-methyl-phenyl)-urea | m.p. 66–67° |
| 42 | N-(diethoxy-phosphinyloxy)-N-methyl-N'-(3-chloro-4-methyl-phenyl)-urea | m.p. 86–88° |
| 43 | N-(diethoxy-phosphinothioyloxy)-N-methyl-N'-(3-chloro-4-methyl-phenyl)-urea | m.p. 56–58° |
| 44 | N-(dimethoxy-phosphinyloxy)-N-methyl-N'-(3-methyl-4-bromo-phenyl)-urea | m.p. 110–113° |
| 45 | N-(dimethoxy-phosphinothioyloxy)-N-methyl-N'-(3-methyl-4-bromo-phenyl)-urea | m.p. 69–70° |
| 46 | N-(diethoxy-phosphinyloxy)-N-methyl-N'-(3-methyl-4-bromo-phenyl)-urea | m.p. 98–100° |
| 47 | N-(diethoxy-phosphinothioyloxy)-N-methyl-N'-(3-methyl-4-bromo-phenyl)-urea | m.p. 52–54° |

The herbicidal action of the novel urea compounds is illustrated by the following tests.

1. Preemergence test with test plants grown from seed

The active substance, in the form of a 10% powder concentrate, is mixed, in a concentration of 1 g of active ingredient per square meter of soil, into garden soil. Seed trays are filled with a 1 cm-layer of this prepared soil. The following test plants:

oats (*Avena sativa*),
mustard (*Sinapis arvensis*),
Italian Ray grass (*Lolium multiflorum*),
tomato (*Solanum lycopersicum*),
millet (*Setaria italica*), are sown in the seed trays and kept in daylight in a greenhouse at 20° to 24°C and 70% relative humidity. The test plants were evaluated after 20 days and the evaluation is expressed according to the following scale:

10 = plants undamaged = control
0 = plants dead
9–1 = intermediate degrees of damage.

The 10% powder concentrate has the following composition:

10 parts of active ingredient, 0.6 part of dibutylnaphthalenesulfonic acid-sodium salt, 1 part of naphthalenesulfonic acid/phenolsulfonic acid/formaldehyde condensation product (3:2:1), 10 parts of sodium aluminum silicate and 78.4 parts of kaolin.

Table II

| compound Example No. | oats | mustard | Italian Raygrass | tomato | millet |
| --- | --- | --- | --- | --- | --- |
| 1 | 4 | 0 | 0 | — | — |
| 2 | 0 | 0 | 0 | — | — |
| 4 | 0 | 0 | 0 | 0 | 0 |
| 5 | 0 | 0 | 0 | 0 | 0 |
| 7 | 0 | 0 | 0 | 0 | 0 |
| 8 | 1 | 0 | 1 | 0 | 2 |
| 9 | 0 | 0 | 0 | 0 | 0 |
| 10 | 0 | 0 | 0 | 0 | 0 |
| 11 | 0 | 0 | 0 | 0 | 0 |
| 12 | 0 | 0 | 0 | 0 | 0 |
| 13 | 0 | 0 | 0 | 0 | 0 |
| 14 | 0 | 0 | 0 | 0 | 0 |
| 16 | 0 | 0 | 0 | 0 | 0 |
| 17 | 0 | 0 | 0 | 0 | 0 |
| 18 | 0 | 0 | 0 | 0 | 0 |
| 19 | 0 | 0 | 0 | 0 | 0 |
| 20 | 0 | 0 | 0 | 0 | 0 |
| 21 | 0 | 0 | 0 | 0 | 1 |
| 23 | 0 | 1 | 0 | 0 | 2 |
| 25 | 0 | 0 | 0 | 0 | 1 |
| 26 | 1 | 0 | 1 | 2 | 2 |
| 29 | 0 | 0 | 0 | 2 | 1 |

2. Herbicidal action when the active substances are applied after emergence of the test plants As test plants, oats (*Avena sativa*) and mustard (*Sinapis alba*) are grown in plastic pots. In the 2 to 4-leaf stage the plants are treated with a 2% aqueous emulsion of the active ingredient (obtained from a 25% emulsifiable concentrate) in a concentration corresponding to 5 kg per hectare and then kept in daylight at 25° – 28° and 40 – 50% relative humidity. After 7 days the test is evaluated according to the following scale:

10 = plants undamaged (control)
9–1 = intermediate degrees of damage
0 = plants dead.

The emulsifiable concentrate has the following composition:

25 parts of active ingredient, 32.5 parts of Isophorone (3,5,5-trimethyl-2-cyclohexen-1-one), 32.5 parts of methyl ethyl ketone, 10 parts of a composite emulsifier consisting of a mixture of nonylphenol polyoxyethylene and calcium dodecylbenzene sulfonate.

onum persicaria, Atriplex, millet, and *Capsella bursa pastoris*, are sown in seed trays. In the four-leaf stage the plants are sprayed with a 2% aqueous emulsion. Then the plants are kept at 25°–28° and 40–50% relative humidity under daylight.

The test is evaluated after 8 days (A) and after 18 days (B), according to the following scale of 10:

10 = plants undamaged = control
0 = plants dead
9–1 = intermediate degrees of damage.

The 2% aqueous emulsion was obtained by diluting with water a 25% emulsifiable concentrate having the following composition: 25 parts of active ingredient, 32.5 parts of isophorone, 32.5 parts of methyl ethyl ketone, 10 parts of composite emulsifier consisting of nonylphenolpolyoxyethylene and calcium dodecylbenzolsulfonate.

The wheat plants tested as cultivated plant showed only weak but reversible damage after 18 days.

TABLE IV

| Active Substance | Concentration in kg/ha | Herbicidal Effect on: | | | | | | | | | | | | |
|---|---|---|---|---|---|---|---|---|---|---|---|---|---|---|
| | | Chenop. | | Sinapis | | Polyg.con. | | Polyg.per. | | Atriplex | | millet | | Capsella |
| | | A | B | A | B | A | B | A | B | A | B | A | B | A | B |
| N-[diethoxy-phosphinothioyl-oxy]-N-methyl-N'-(3,4-dichlorophenyl)-urea | 1.5 | 0 | 0 | 0 | 0 | 6 | 1 | 3 | 2 | 0 | 0 | 9 | 1 | 4 | 0 |
| | 3 | 0 | 0 | 0 | 0 | 1 | 0 | 3 | 2 | 0 | 0 | 1 | 1 | 1 | 0 |
| | 5 | 0 | 0 | 0 | 0 | 0 | 0 | 2 | 1 | 0 | 0 | 1 | 1 | 0 | 2 |

Table III
a. Compounds according to the invention:

| Compound Example No. | oats | mustard |
|---|---|---|
| 11 | 2 | 1 |
| 12 | 1 | 0 |
| 14 | 3 | 1 |
| 17 | 3 | 2 |
| 18 | 2 | 4 |
| 20 | 1 | 1 | b. Compounds according to South African Patent No. 67/4170:

| | oats | mustard |
|---|---|---|
| $CH_3-N\begin{array}{l}-CONH-C_6H_3Cl_2\\ -OCONHCH_3\end{array}$ | 9 | 9 |
| $CH_3-N\begin{array}{l}-CONH-C_6H_3Cl_2\\ -OCON(CH_3)_2\end{array}$ | 9 | 8 |
| $CH_3-N\begin{array}{l}-CONH-C_6H_3Cl_2\\ -OCONHCH_2CH_3\end{array}$ | 10 | 10 |

3. Postemergence test with weeds grown from seed

The test plants wheat (cultivated plant, *Chenopodium album*, *Sinapis arvensis*, *Polygonum convolvulus*, *Polyg- 4. Effect on planted weeds when applied after emergence of the plants in the field.

The following weeds were sown in a preferred seedbed: *Sinapis alba*, *Amaranthus* spec., *Galium aparine*, *Taraxacum officinalis* and *Lolium multiflora*. When the plants were 5 to 15 cm high (depending on the variety), they are sprayed with an aqueous emulsion of the active substance. 18 days after treatment, the effect is evaluated according to the the following logarithmic index:

1 = 100% effective on the planted weeds
4 = 90% effective on the planted weeds
9 = no effect.

The aqueous emulsion was obtained by diluting with water a 25% emulsifiable concentrate having the following composition: 25 parts of active ingredient, 5 parts of a composite emulsifier consisting of nonylphenolpolyethylene and calcium dodecylbenzolsulfonate, 67.5 parts of xylene and 2.5 parts of epichlorohydrin.

4-(2,4-dichlorophenoxy)-butyric acid and salts and esters thereof,
4-(2-methyl-4-chlorophenoxy)-butyric acid and salts Table V

| Active Substance | kg/ha | Sinapis alba | Amaranthus spez. | Galium aparine | Taraxacum off. | Lolium multifl. |
|---|---|---|---|---|---|---|
| N-[diethoxy-phosphinothioyl-oxy]-N-methyl-N'-(3,4-dichlorophenyl)-urea | 1 | 4 | 4 | 1 | | |
| | 2 | 2 | 1 | 1 | 1 | 4 |
| | 3 | 2 | 1 | 1 | 1 | 2 |
| | 4 | 2 | 1 | 1 | 1 | 2 |
| | 5 | 2 | 1 | 1 | 1 | 2 |

For the preparation of herbicidal compositions, the active substances are mixed with suitable carriers and/or dispersing agents. To widen the range of action, these compositions can be admixed with other herbicides, for example triazines such as halogen-diamino-s-triazines, alkoxy- and alkylthio-diamino-s-triazines, triazoles, diazines, such a uracils, aliphatic carboxylic acids, halogenated benzoic acids and phenylacetic acids, aryloxyalkane carboxylic acids, hydrazides, amides, nitriles, esters of such carboxylic acids, carbamic acid esters and thiocarbamic acid esters, ureas, etc.

Representatives of such herbicidally active substances which can be admixed are, e.g., the following compounds:

2-chloro-4,6-bis-(ethylamino)-s-triazine,
2-chloro-4-ethylamino-6-isopropylamino-s-triazine,
2-methoxy-4,6-bis-(isopropylamino)-s-triazine,
2-diethylamino-4-isopropylacetamido-6-methoxy-s-triazine,
2-isopropylamino-4-methoxypropylamino-6-methylthio-s-triazine,
2-methylthio-4,6-bis-(isopropylamino)-s-triazine,
2-methylthio-4,6-bis-(ethylamino)-s-triazine,
2-methylthio-4-ethylamino-6-isopropylamino-s-triazine,
2-methoxy-4-ethylamino-6-isopropylamino-s-triazine,
2-methoxy-4,6-bis-(ethylamino)-s-triazine,
2-chloro-4,6-bis-(isopropylamino)-s-triazine,
dinitro-sec.-butylphenol and salts thereof,
pentachlorophenol and salts thereof,
trichloroacetic acid and salts thereof,
2,2-dichloropropionic acid and salts thereof,
2-chloro-N,N-diallylacetic acid amide,
maleic acid hydrazide,
2,3,6-trichlorobenzoic acid and salts thereof,
2,3,5,6-tetrachlorobenzoic acid and salts thereof,
2-methoxy-3,5,6-trichlorobenzoic acid and salts thereof,
2-methoxy-3,6-dichlorobenzoic acid and salts thereof,
3-amino-2,5-dichlorobenzoic acid and salts thereof,
3-nitro-2,5-dichlorobenzoic acid and salts thereof,
2-methyl-3,6-dichlorobenzoic acid and salts thereof,
2,6-dichlorobenzonitrile,
2,6-dichloro-thiobenzamide,
2,3,6-trichlorophenylacetic acid and salts thereof,
2,4-dichlorophenoxyacetic acid and salts thereof,
2,4,5-trichlorophenoxyacetic acid and salts and esters thereof,
(2-methyl-4-chlorophenoxy)-acetic acid and salts and esters thereof,
2-(2,4,5-trichlorophenoxy)-propionic acid and salts and esters thereof,
2-(2,4,5-trichlorophenoxy)-ethyl-2,2-dichloropropionate,
and esters thereof,
2,3,6-trichlorobenzyloxypropanol,
4-amino-3,5,6-trichloropicolinic acid,
N'-cyclooctyl-N,N-dimethyl-urea,
3-phenyl-1,1-dimethyl-urea,
3-(4'-chlorophenyl)-1,1-dimethyl-urea,
3-(3'-trifluoromethylphenyl)-1,1-dimethyl-urea,
3-(3',4'-dichlorophenyl)-1,1-dimethyl-urea,
3-(3',4'-dichlorophenyl)-1-n-butyl-1-methyl-urea,
3-(3',4'-dichlorophenyl)-1,1,3-trimethyl-urea,
3-(3',4'-dichlorophenyl)-1,1-diethyl-urea,
3-(4'-chlorophenyl)-1-methoxy-1-methyl-urea,
3-(3',4'-dichlorophenyl)-1-methoxy-1-methyl-urea,
3-(4'-bromophenyl)-1-methoxy-1-methyl-urea,
3-(3',4'-dichlorophenyl)-3-methoxy-1,1-dimethyl-urea,
3-(4'-chlorophenoxyphenyl)-1,1-dimethyl-urea,
N,N-di-(n-propyl)-S-ethyl-thiocarbamate,
N,N-di-(n-propyl)S-n-propyl-thiocarbamate,
N-ethyl-N-(n-butyl)-S-n-propyl-thiocarbamate,
N-phenyl-O-isopropyl-carbamate,
N-(m-chlorophenyl)-O-isopropyl-carbamate,
N-(m-chlorophenyl)-O-4-chloro-butyn-(2)-yl-carbamate,
N-(3',4'-dichlorophenyl)-O-methyl-carbamate.

The production of herbicidal compositions according to the invention is performed in a known manner by intimate mixing and grinding of active substances of the general Formula I together with suitable carriers, optionally with the addition of dispersing agents or solvents, which are inert towards the active substances. The active substances can be used and applied as dusts, scattering agents, granulates, coated granulates, impregnated granulates, homogeneous granulates, wettable powders, pastes, emulsions, solutions or aerosols.

For the production of solid preparation (dusts, scattering agents, granulates) the active ingredients are mixed with solid carriers. The particle size of the carriers is from about 0.075 to 0.2 mm for dusts, and 0.2 mm or more for granulates. The concentration of active ingredient in the solid preparations is usually 0.5 to 90%, preferably 1.0 to 80%. These mixtures can also contain additives which stabilize the active ingredient and/or substances which are non-ionic, or anionically or cationically active, which substances, for example, improve the adhesion of the active ingredients on plants or parts of plants (adhesives and agglutinants) and/or ensure a better wettability (wetting agents) and dispersibility (dispersing agents).

Water-dispersible concentrates of the active substance, wettable powders, pastes and emulsion concentrates, are compositions which can be diluted with water to any desired concentration. They consist of active substance, carrier, optionally additives for stabilizing the active substance, surface-active substances and anti-foaming agents, and optionally solvents. The concentration of active substance in these preparations is from 5 to 80%. The wettable powders and pastes are obtained by mixing and grinding the active substances with dispersing agents and pulverulent carriers in suitable equipment until the products are homogeneous. In some cases it is advantageous to use mixtures of different carriers. The anti-foaming agents may, for example, be silicones. The active substances are so mixed, ground, sieved and classified with the above-mentioned additives that in the wettable powders the solid fraction does not exceed a particle size of 0.02 to 0.04 and in pastes does not exceed 0.003 mm. Dispersing agents, organic solvents and water are used for the preparation of emulsion concentrates and pastes. The solvents must be practically odorless, non-phytotoxic, inert towards the active substances and not easily combustible.

Furthermore, the compositions according to the invention may be applied in the form of solutions. For this purpose, one or more of the active substances of the general Formula I is or are dissolved in suitable organic solvents, mixtures of solvents, or water. The concentration of the active substances contained in the solutions should be in the range of 10 to 30%. Other biocidal active substances or agents can be admixed with the compositions described according to the invention. Thus, in addition to the said compounds of the general Formula I and other herbicides, the new compositions may contain, for example, insecticides, fungicides, bactericides, fungistatic and bacteriostatic substances or nematocides in order to broaden the range of action.

The compositions according to the invention may also contain plant fertilizers, trace elements, etc.

Preparations containing the new ureas are described below. Parts are expressed by weight.

Granulate

The following ingredients are used to produce a 5% granulate:
- 5 parts of N-[diethoxy-phosphinyl-oxy]-N-methyl-N'-(4-bromophenyl)-urea,
- 0.25 part of epichlorohydrin,
- 0.25 part of cetyl polyglycol ether,
- 3.50 parts of polyethylene glycol ("Carbowax"),
- 91 parts of kaolin (particle size 0.3 – 0.8 mm).

The active ingredient is mixed with epichlorohydrin and dissolved with 6 parts of acetone, then the polyethylene glycol and cetyl polyglycol ether are added. The resulting solution is sprayed onto kaolin and the acetone is then evaporated in vacuo.

Wettable powder

The following components are used for the preparation of (a) 50%, (b) 25% and (c) 10% wettable powders:

a. 50 parts of N-[diethoxy-phosphinothioyl-oxy]-N-methyl-N'-(3,4-dichlorophenyl)-urea,
  5 parts of sodium dibutylnaphthyl sulfonate,
  3 parts of naphthalene sulfonic acid/phenol sulfonic acid/formaldehyde condensation product (3:2:1),
  20 parts of kaolin,
  22 parts of Champagne chalk;

b. 25 parts of N[diethoxy-phosphinothioyl-oxy]-N-methyl-N'-(4-chlorophenyl)-urea,
  5 parts of the sodium salt of oleylmethyl tauride,
  2.5 parts of naphthalene sulfonic acid/formaldehyde condensation product,
  0.5 part of carboxymethyl cellulose
  5 parts of neutral potassium aluminium silicate,
  62 parts of kaolin;

c. 10 parts of N-[diethoxy-phosphinyl-oxy]-N-methyl-N'-4-bromophenyl)-urea,
  3 parts of mixture of sodium salts of saturated fatty alcohol sulfates,
  5 parts of naphthalene sulfonic acid/formaldehyde condensation product,
  82 part of kaolin.

The given active ingredient is absorbed onto the corresponding carriers (kaoline and chalk) and then mixed and ground. Wettable powders having excellent wettability and suspensibility are obtained. By dilution with water, suspensions of any desired concentration of the active ingredients can be obtained from such wettable powders. Such suspensions are suitable for the control of weeds and wild grasses incultivated plantations.

Paste

The following ingredients are used for the preparation of a 45% paste:
- 45 parts of N-[diethoxy-phosphinothioyl-oxy]-N-methyl-N'-(3,4-dichlorophenyl)-urea,
- 5 parts of sodium aluminium silicate,
- 15 parts of cetyl polyglycol ether,
- 2 parts of spindle oil,
- 10 parts of polyethylene glycol ("Carbowax"),
- 23 parts of water.

The active ingredient is intimately mixed and ground in suitable equipment with the additives. A paste is obtained which can be diluted with water to prepare suspensions of any desired concentration. These suspensions are suitable for the treatment of vegetable plantations.

Emulsion concentrate

To prepare a 10% emulsion concentrate
- 10 parts of N-[diethoxy-phosphinothioyl-oxy]-N-methyl-N'-(3,4-dichlorophenyl)-urea,
- 15 parts of oleyl polyglycol ether having 8 mol of ethylene oxide, and
- 75 parts of isophorone are mixed together. This concentrate can be diluted with water to emulsions of suitable concentrations. Such emulsions are suitable for the control of weeds in cultivated plants such as cotton, maize, etc.

What we claim is:

1. A herbicidal composition which comprises a herbicidally effective amount of a compound of the formula

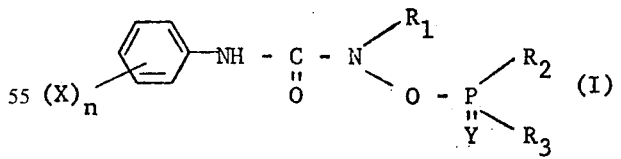

wherein
  $R_1$ represents methyl or ethyl,
  $R_2$ and $R_3$ each independently represent lower alkoxy or di-lower alkylamino,
  X represents lower alkyl, lower alkoxy, lower alkylthio, halogeno loweralkyl, halogen or cyano,
  Y represents oxygen or sulfur, and
  $n$ represents an integer from 0 to 2,
and an agriculturally acceptable carrier or distributing agent.

2. A herbicidal composition according to claim 1, wherein said compound is N-(diethoxyphosphinothioyloxy)-N-methyl-N'-(3,4-dichlorophenyl)-urea.

3. A herbicidal composition according to claim 1, wherein said compound is N-(diethoxyphosphinyloxy)-N-methyl-N'-(4-bromophenyl)-urea.

4. Method for controlling weeds and wild grasses which comprises applying to an area infested therewith a herbicidally effective amount of a compound of the formula

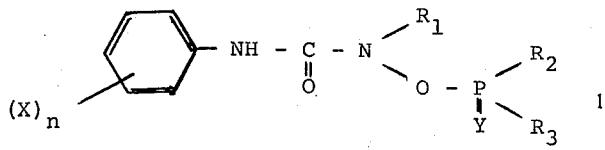

wherein
- $R_1$ represents methyl or ethyl,
- $R_2$ and $R_3$ each independently represent lower alkoxy or di-lower lower alkylamino,
- X represents lower alkyl, lower alkoxy, lower alkylthio, halogeno lower alkyl, halogen or cyano,
- Y represents oxygen or sulfur, and
- $n$ represents an integer from 0 to 2.

5. A method according to claim 4 in which the compound is N-(diethoxyphosphinothioyloxy)-N-methyl-N'-(3,4-dichlorophenyl)-urea.

6. A method according to claim 4 in which the compound is N-(diethoxyphosphinyloxy)-N-methyl-N'-(4-bromophenyl)-urea.

* * * * *